United States Patent
Graham et al.

(10) Patent No.: US 10,518,356 B2
(45) Date of Patent: Dec. 31, 2019

(54) METHODS AND APPARATUS FOR GENERATING ADDITIVE MANUFACTURING SCAN PATHS USING THERMAL AND STRAIN MODELING

(71) Applicant: General Electric Company, Schenectady, NY (US)

(72) Inventors: Michael Evans Graham, Slingerlands, NY (US); Lang Yuan, Niskayuna, NY (US); Thomas Adcock, Niskayuna, NY (US); Justin Gambone, Jr., Niskayuna, NY (US); James Sears, Reading, PA (US); John Madelone, South Glens Falls, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 13 days.

(21) Appl. No.: 15/888,815

(22) Filed: Feb. 5, 2018

(65) Prior Publication Data
US 2019/0240775 A1 Aug. 8, 2019

(51) Int. Cl.
*B33Y 50/02* (2015.01)
*G05B 19/4099* (2006.01)
(Continued)

(52) U.S. Cl.
CPC ........ *B23K 26/0876* (2013.01); *B23K 26/082* (2015.10); *B23K 26/34* (2013.01);
(Continued)

(58) Field of Classification Search
CPC ............ G05B 19/4097; G05B 19/4099; G06F 17/5018
See application file for complete search history.

(56) References Cited

U.S. PATENT DOCUMENTS

| 5,104,592 A | 4/1992 | Hull et al. |
| 5,155,324 A | 10/1992 | Deckard et al. |

(Continued)

FOREIGN PATENT DOCUMENTS

| DE | 10112591 A1 | 10/2001 |
| DE | 10042134 A1 | 3/2002 |

(Continued)

OTHER PUBLICATIONS

Carter, Luke et al., "The Influence of the Laser Scan Strategy on Grain Structure and Cracking Behaviour in SLM Powder-Bed Fabricated Nickel Superalloy", Journal of Alloys and Compounds, vol. 615, Dec. 5, 2014, DOI: 10.1016/j.jallcom.2014.06.172, 29pgs.

(Continued)

*Primary Examiner* — Ronald D Hartman, Jr.
(74) *Attorney, Agent, or Firm* — Buckley, Maschoff & Talwalkar LLC

(57) ABSTRACT

A method includes applying thermal and/or strain modeling to the CAD representation of an object. In addition, scan path data is generated based at least in part on a result of the thermal and/or strain modeling. A build file comprising the scan path data is generated. The build file comprises instructions that configure an additive manufacturing tool to generate the object according to the scan path data.

14 Claims, 14 Drawing Sheets

(51) Int. Cl.
  *B23K 26/08* (2014.01)
  *B23K 26/354* (2014.01)
  *B23K 26/082* (2014.01)
  *B23K 26/34* (2014.01)
  *G06F 17/50* (2006.01)

(52) U.S. Cl.
  CPC ............ *B23K 26/354* (2015.10); *B33Y 50/02* (2014.12); *G05B 19/4099* (2013.01); *G05B 2219/35134* (2013.01); *G05B 2219/49007* (2013.01); *G06F 17/50* (2013.01); *G06F 2217/12* (2013.01)

(56) References Cited

U.S. PATENT DOCUMENTS

| | | | |
|---|---|---|---|
| 5,238,639 | A | 8/1993 | Vinson et al. |
| 5,429,908 | A | 7/1995 | Hokuf et al. |
| 5,562,929 | A | 10/1996 | Asano |
| 5,932,059 | A | 8/1999 | Langer et al. |
| 6,399,010 | B1 | 6/2002 | Guertin et al. |
| 6,676,892 | B2 | 1/2004 | Das et al. |
| 6,699,424 | B2 | 3/2004 | Nguyen et al. |
| 7,168,935 | B1 * | 1/2007 | Taminger ............ B23K 15/0073 219/121.12 |
| 7,569,174 | B2 | 8/2009 | Ruatta et al. |
| 7,962,237 | B2 | 6/2011 | Kritchman |
| 8,034,279 | B2 | 10/2011 | Dimter et al. |
| 9,352,421 | B2 | 5/2016 | Illston |
| 9,522,426 | B2 | 12/2016 | Das et al. |
| 2008/0286139 | A1 * | 11/2008 | Abe ...................... B22F 3/1055 419/7 |
| 2009/0018685 | A1 * | 1/2009 | Holzwarth ............. G06F 17/50 700/98 |
| 2011/0109016 | A1 * | 5/2011 | Fuwa .................... B22F 3/1055 264/460 |
| 2015/0174695 | A1 | 6/2015 | Elfstroem et al. |
| 2015/0174699 | A1 | 6/2015 | Bruck |
| 2016/0299996 | A1 | 10/2016 | Huang |
| 2017/0014169 | A1 | 1/2017 | Dean et al. |
| 2017/0203515 | A1 * | 7/2017 | Bennett ................ B29C 64/393 |
| 2017/0364058 | A1 * | 12/2017 | Jagdale ............. G05B 19/4099 |
| 2018/0314235 | A1 * | 11/2018 | Mirabella ........... G06F 17/5018 |
| 2018/0341248 | A1 * | 11/2018 | Mehr ................. G05B 19/4099 |
| 2018/0348734 | A1 * | 12/2018 | Berlier ............... G05B 19/4097 |
| 2019/0011903 | A1 * | 1/2019 | Jacobs, II .......... G05B 19/4099 |

FOREIGN PATENT DOCUMENTS

| | | |
|---|---|---|
| EP | 0590956 A1 | 4/1994 |
| WO | 2004056509 A1 | 7/2004 |
| WO | 2015140547 A1 | 9/2015 |
| WO | 2017085469 A1 | 5/2017 |

OTHER PUBLICATIONS

Arosoy, Yiğit M., et al., "Influence of scan strategy and process parameters on microstructure and its optimization in additively manufactured nickel alloy 625 via laser powder bed fusion", The International Journal of Advanced Manufacturing Technology, vol. 90 Issue: 5-8, May 2017, DOI: 10.1007/s00170-016-9429-z, (pp. 1393-1417, 25 total pages).

* cited by examiner

| S | S | S | S | S | S | S |
|---|---|---|---|---|---|---|
| S | G | G | G | G | G | S |
| V | T | T | T | T | T | V |
| V | T | T | T | T | T | V |
| V | T | T | T | T | T | V |
| V | T | T | T | T | T | V |
| V | T | T | T | T | T | V |
| V | V | G<br>V | G<br>V | G<br>V | V | V |
| V | V | S<br>G<br>V | S<br>G<br>V | S<br>G<br>V | V | V |
| V | V | V | V | V | V | V |
| V | V | V | V | V | V | V |
| V | V | V | V | V | V | V |
| V | V | V | V | V | V | V |

FIG. 9

| 1 | 3 | 4 | 4 | 4 | 3 | 1 |
|---|---|---|---|---|---|---|
| 4 | 4 | 5 | 5 | 5 | 4 | 4 |
| 5 | 5 | 6 | 6 | 6 | 5 | 5 |
| 6 | 7 | 9 | 9 | 9 | 7 | 6 |
| 7 | 10 | 12 | 12 | 12 | 10 | 7 |
| 8 | 13 | 15 | 15 | 15 | 13 | 8 |
| 10 | 16 | 18 | 18 | ⋀ | 16 | 10 |
| 10 | 20 | 22 | 22 | ⋀ | 20 | 10 |
| 10 | 20 | 26 | 26 | ⋀ | 20 | 10 |
| 10 | 20 | 30 | 30 | ⋀ | 20 | 10 |
| 10 | 20 | 30 | 30 | 30 | 20 | 10 |
| 10 | 20 | 20 | 20 | 20 | 20 | 10 |
| 9 | 10 | 10 | 10 | 10 | 10 | 9 |

FIG. 10

| 397 | 392 | 389 | 388 | 387 | 388 | 391 |
|---|---|---|---|---|---|---|
| 384 | 383 | 380 | 379 | 378 | 379 | 378 |
| 375 | 374 | 371 | 370 | 369 | 370 | 369 |
| 366 | 363 | 358 | 357 | 356 | 359 | 360 |
| 357 | 350 | 345 | 344 | 343 | 346 | 351 |
| 348 | 337 | 332 | 331 | 330 | 333 | 342 |
| 337 | 324 | 319 | 318 | 317 | 320 | 331 |
| 330 | 309 | 304 | 303 | 302 | 305 | 324 |
| 323 | 302 | 289 | 288 | ∧ | 298 | 317 |
| 316 | 295 | 274 | 273 | 272 | 291 | 310 |
| 309 | 288 | 267 | 266 | 265 | 284 | 303 |
| 302 | 281 | 280 | 279 | 278 | 277 | 296 |
| 297 | 294 | 293 | 292 | 291 | 290 | 291 |

—1102
—802

| 21.2 | 52.6 | 128.2 | 146.6 | 128.2 | 52.6 | 21.2 |
|------|------|-------|-------|-------|------|------|
| 75.2 | 123.7 | 149.8 | 143.8 | 149.8 | 123.7 | 75.2 |
| 134.8 | 86.7 | 9.1 | 56.1 | 9.1 | 86.7 | 134.8 |
| 56.1 | 137.6 | 124.6 | 61.8 | 124.6 | 137.6 | 56.1 |
| 119.8 | 35.9 | 141.5 | 80.5 | 141.5 | 35.9 | 119.8 |
| 142.0 | 66.0 | 147.1 | 97.5 | 147.1 | 66.0 | 142.0 |
| 39.6 | 129.5 | 138.9 | 74.0 | 138.9 | 129.5 | 39.6 |
| 147.1 | 138.7 | 133.8 | 1.3 | 133.8 | 138.7 | 147.1 |
| 97.5 | 27.3 | 135.8 | 114.4 | 135.8 | 27.3 | 97.5 |
| 97.5 | 97.3 | 90.2 | 57.4 | 90.2 | 97.3 | 97.5 |
| 97.5 | 5.9 | 95.3 | 149.9 | 95.3 | 5.9 | 97.5 |
| 84.7 | 39.1 | 5.9 | 136.9 | 5.9 | 39.1 | 84.7 |
| 46.7 | 84.7 | 97.5 | 97.5 | 97.5 | 84.7 | 46.7 |

METHODS AND APPARATUS FOR GENERATING ADDITIVE MANUFACTURING SCAN PATHS USING THERMAL AND STRAIN MODELING

BACKGROUND

Technical Field

Embodiments of the invention relate to additive manufacturing.

Discussion of Art

One known form of additive manufacturing is known as "DMLM" (direct metal laser melting). In this form of manufacturing, a part or object is formed layer-by-layer from powdered metal. The powdered metal for a given layer is melted via heating with one or more lasers such that the melted metal upon cooling forms the shape of the object for the current layer, while joining with the layer below. The laser or lasers are driven to scan over the field of powdered metal to achieve the required heating.

In some conventional techniques for DMLM, a uniform layer thickness is used throughout the process of forming the object. It is also typical to define the laser scan paths using fixed geometric algorithms, such as parallel straight lines, repeated patterns, herringbone patterns and/or parallel curved scans.

The present inventors have now recognized opportunities to achieve improved manufacturing speed, specific material characteristics in the finished object and/or other objectives by generation of more granular laser scan paths.

BRIEF DESCRIPTION

In some embodiments, a method includes obtaining a CAD (computer-aided design) representation of an object. Thermal and/or strain modeling is applied to the CAD representation. Scan path data is generated based at least in part on a result of the thermal and/or strain modeling. A build file which comprises the scan path data is generated. The build file comprises instructions that configure an additive manufacturing tool to generate the object according to the scan path data.

BRIEF DESCRIPTION OF THE DRAWINGS

FIG. 9 is a diagram that shows cells of FIG. 8 populated with indicators of cell-wise-determined objectives in a simulation of the process of FIGS. 5A and 5B.

FIG. 10 is a diagram that shows cells of FIG. 8 populated with simulated cell-wise heat-loss-characteristic estimated values or functions.

FIG. 13 is a diagram that shows cells of FIG. 8 populated with simulated scan spacing determined for each cell during the process of FIGS. 5A and 5B.

DESCRIPTION

Some embodiments of the invention relate to additive manufacturing. One or more objectives are considered in conjunction with cell-wise thermal and/or strain modeling to produce cell-wise scan paths to be used in a layer-by-layer programming of a DMLM control component. An object is built by additive manufacturing in accordance with the programming of the DMLM control component.

Figure 1:
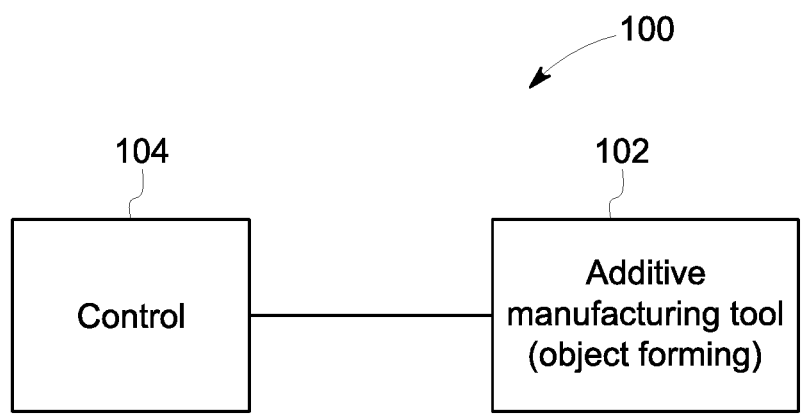
FIG. 1 is a block diagram of an additive manufacturing apparatus according to some embodiments.

FIG. 1 is a block diagram of an additive manufacturing apparatus 100 according to some embodiments. The additive manufacturing apparatus 100 may include an additive manufacturing tool 102 (also referred to as an object-forming component) and a control component 104 operatively coupled to the additive manufacturing tool 102. The additive manufacturing tool 102 may, for example, resemble commercially available DMLM machines such as the model SLM250 or SLM280 available from SLM Solutions, Wixom, Mich.; and the model M2, Mline, Mlab, or M1 available from Concept Laser Inc., Grapevine, Tex. (the latter being a corporate affiliate of the General Electric Company, which is the assignee hereof). The control component 104 may include typical digital processor hardware and related devices (to be described below in connection with FIG. 18) such as program memory, etc., such as are typically used to provide digital control of a DMLM device.

Figure 2:
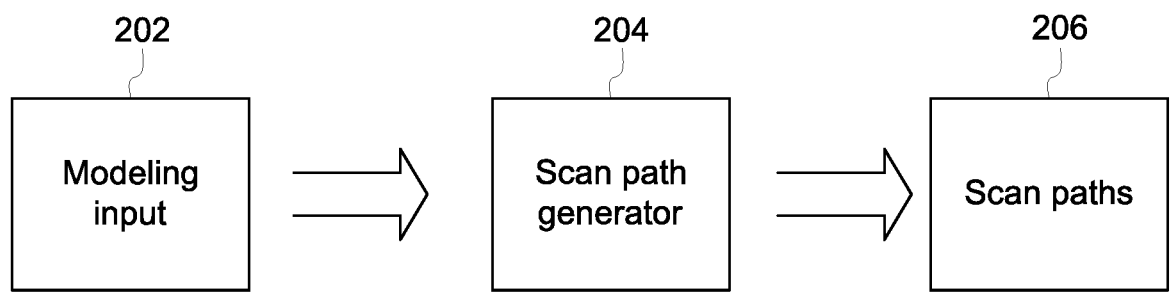
FIG. 2 is a diagram that illustrates at a high level a process performed according to some embodiments.

FIG. 2 is a diagram that illustrates at a high level a process performed according to some embodiments. In simple terms, a CAD model 202 of the object to be built is provided as an input. A scan path generator 204 (e.g., a suite of interrelated software modules) operates on this input. The scan path generator 204, among other inherent features, may embody the effects of properties of the material to be used in the DMLM to form the object. The output of the scan path generator 204 may be a data set of scan paths, indicated at 206. The scan path data set may, but need not, be in the form of a stored data file.

Figure 3:
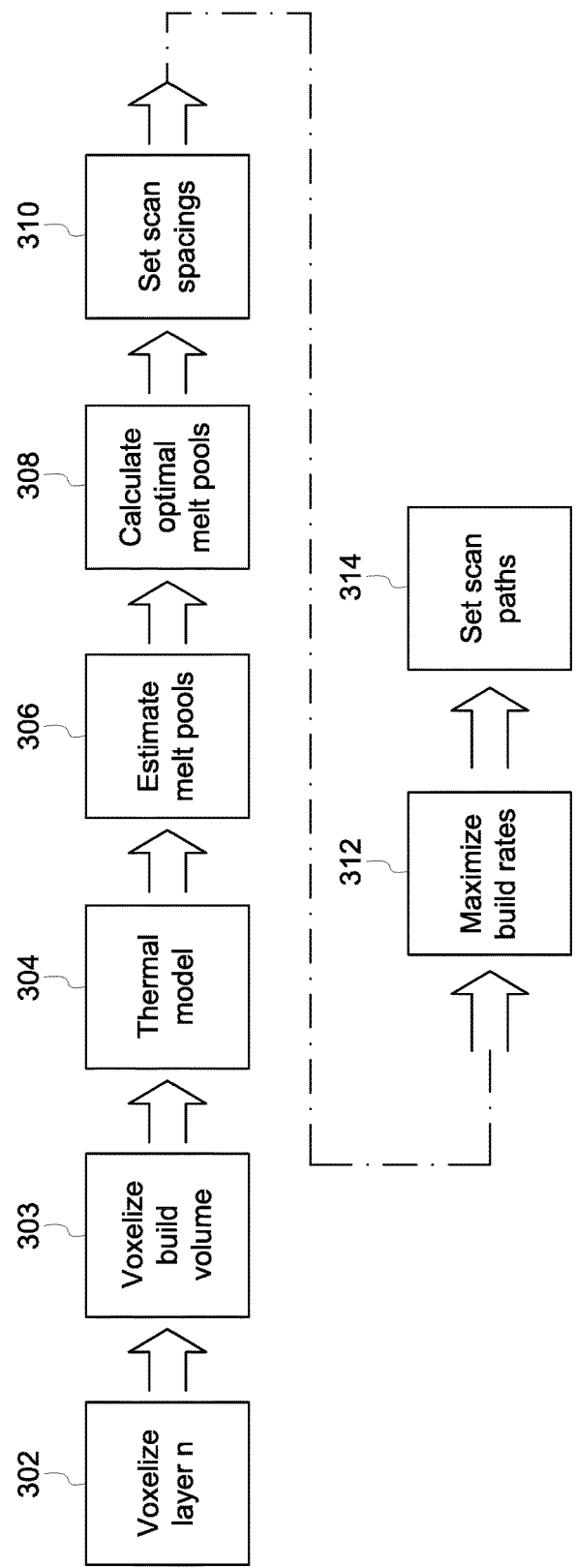
FIGS. 3 and 4 illustrate example embodiments of the process of FIG. 2 in more detail.

FIG. 3 illustrates an example embodiment of the process of FIG. 2 in more detail. In the particular embodiment of FIG. 3, thermal analysis and modeling are employed to serve an objective of increasing throughput (i.e., build-speed).

At block 302 in FIG. 3, a current layer subject to scan path generation is divided into voxels for analytical and modeling purposes.

At block 303, at least a portion of the build volume within the additive manufacturing tool 102 is divided into virtual voxels for analytical and modeling purposes. The division into voxels may be in a two-dimensional format if just the build surface is voxelized (as in a traditional descending bed tool). Alternatively, the division into voxels may be in a three-dimensional format for a voxel space in a tool that has moving optics or some other arrangement that changes the three-dimensional nature of the build space.

At 304, a voxel-by-voxel thermal model is constructed.

At 306, again on a voxel-by-voxel basis, melt pools to be formed during the build are estimated, according to thermal properties and the expected application of laser heating across the layer.

At 308, a geometric calculation is made to determine optimal melt pool dimensions, based on the estimates at 306 and other modeled data.

At 310, based on the optimal melt pools calculated at 308, and also based on laser power, scan speed, spot size, incidence angle and other localized build parameters, a scan spacing parameter is set for each voxel.

There follows, at 312, application of a constraint to maximize build-speed.

Then, at 314, scan paths are generated for each voxel. In one embodiment, paths in adjacent voxels are considered such that the scan paths can connect smoothly from voxel to voxel.

For convenience in illustration, blocks 310-314 in FIG. 3 are represented in a serial format. It should be noted that in a practical embodiment, the process of FIG. 3, as it relates to blocks 310-314, may comprise an optimization of scan spacing and parameters to achieve an objective, such as enhancing build speed subject to constraints related to material properties.

Figure 4:
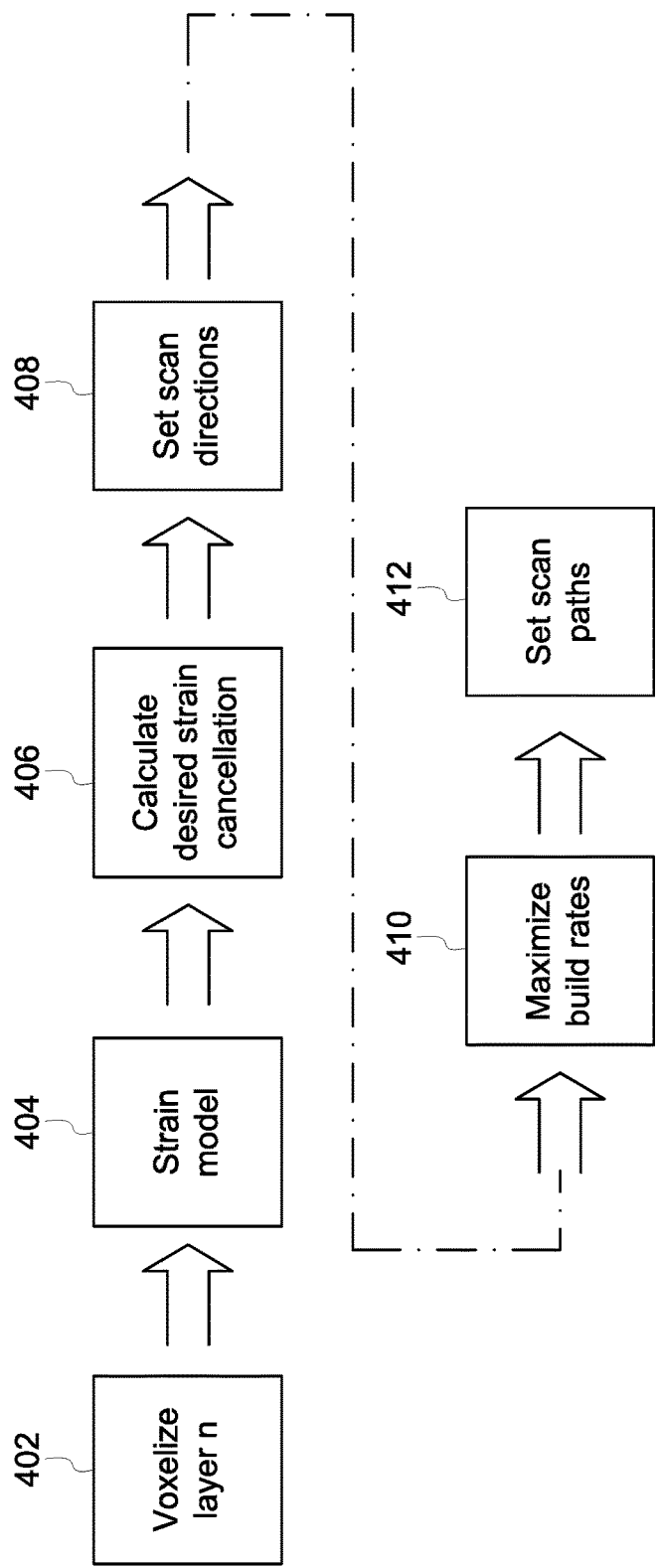

FIG. 4 illustrates an alternative example embodiment of the process of FIG. 2 in more detail.

Block 402 in FIG. 4 is like block 302 in FIG. 3.

At 404 there is constructed a voxel-by-voxel model of strain expected to occur in the object during building.

At 406, calculations are made according to certain criteria to determine what strains would be desirable to have take place in the voxels during building.

At 408, based on the calculations at 406, scan directions are set for each voxel.

At 410, similarly to block 312, and based on the results of 408, a constraint is applied to maximize build-speed.

At 412, like 314, scan paths are generated for each voxel.

In some embodiments, the processes of FIGS. 3 and 4 may be combined, with the processing of blocks 404, 406 and 408 being carried out in parallel with the processing of blocks 304, 306, 308 and 310. In the combined process, the maximum build rates (block 312 or 410) are generated based on output of processes at blocks 310 and 408, and the scan paths are similarly generated in response to output of processes at blocks 310 and 408. The scan paths generated may reflect strain values and directions as determined at 406 and 408 in FIG. 4. The thermal analysis may produce power, speed and spacing for the laser scanning. The strain analysis may produce the direction for the laser scanning.

Figure 5A:
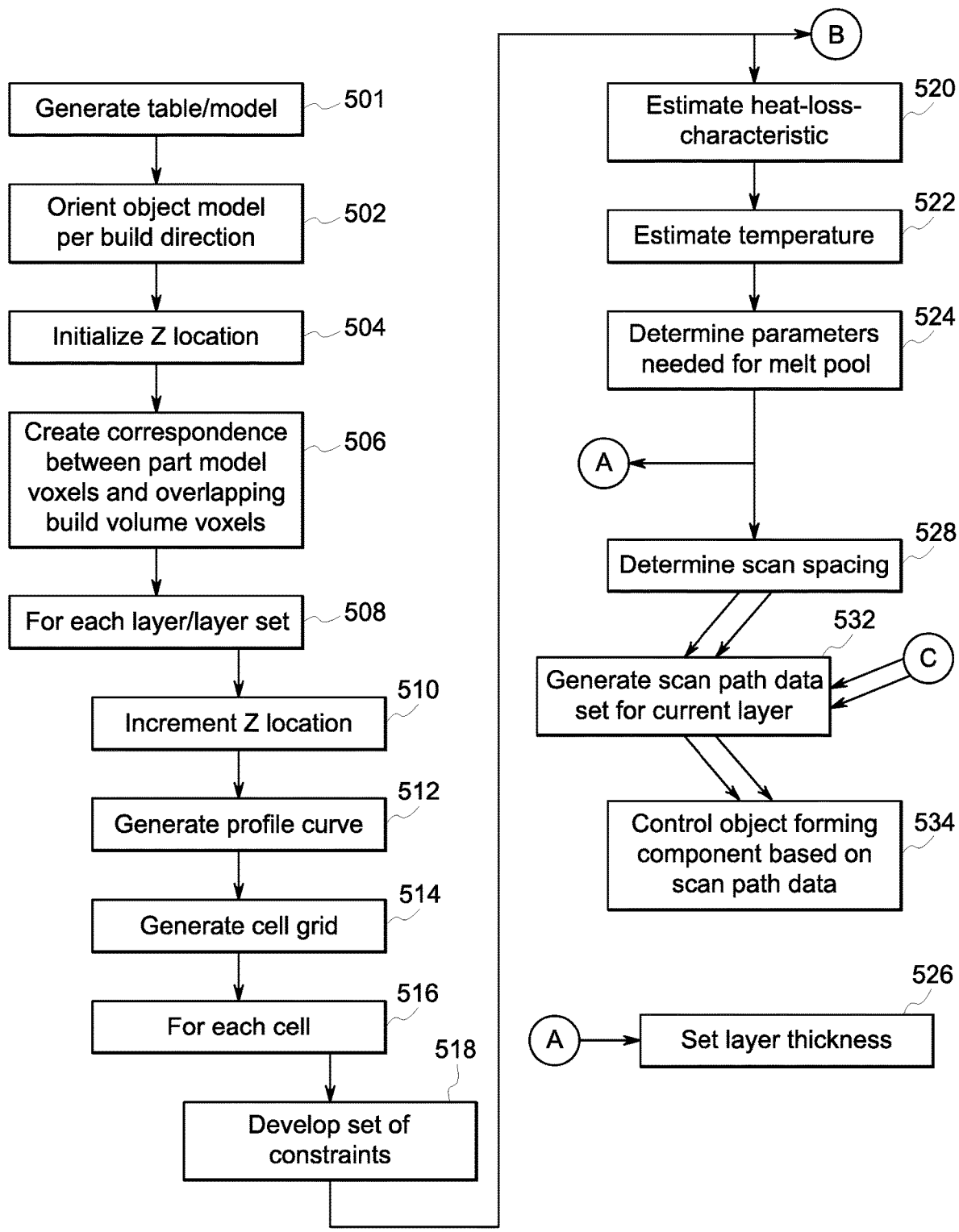
FIGS. 5A and 5B together form a flow diagram that illustrates an embodiment of the process of FIG. 2 in still more detail.
Figure 5B:
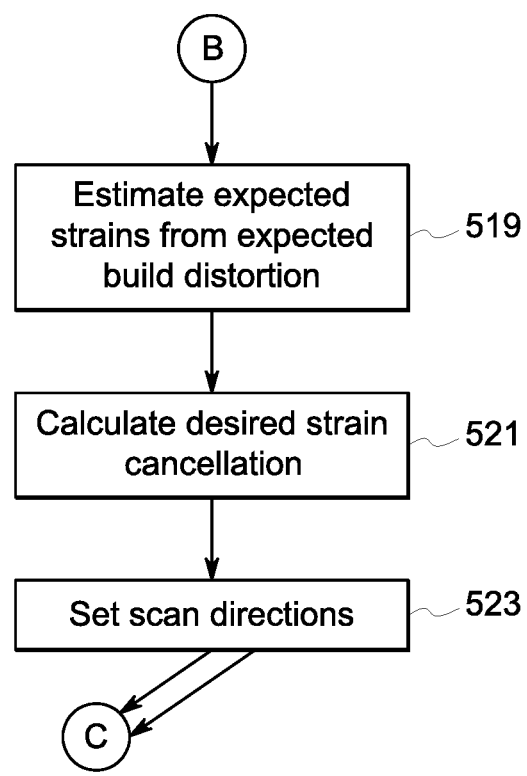

FIGS. 5A and 5B together form a flow diagram that illustrates an embodiment of the process of FIG. 2 in still more detail.

In initial block 501 of the process (shown in FIG. 5A, a melt pool characteristic model/table is generated to estimate a respective heat-loss-characteristic (and related characteristics) for each cell of the object to be built. In this context, "cell" may be considered an alternative term for "voxel". In some embodiments, for example, each cell may be a rectangular prism with dimensions of 1 mm by 1 mm by 1 mm. As will be seen, the thickness of the build layers may vary and may be determined according to teachings of the present disclosure.

The melt pool table has a first column of assumed heat-loss-characteristics for a notional cell. The term "heat-loss-characteristic" for modeling of the object to be built refers to the rate at which heat flows or radiates away from the object/voxel in question during build operations. The next three columns respectively correspond to the length, width and depth of a melt pool associated with the notional cell. Each of those three values is a function of the power, speed and focus of the applicable laser parameters and also of constraints such a strain, grain orientation, thermal objective, velocity objective. The table may be filled out by routine experiments with the material (in solidified form), from which the object is to be built. The column values in the first column may vary over a range of values, and may be repeated to allow for variations in the melt pools to be produced in the notional cell.

As a first step in constructing the heat-loss-characteristic model, at block 502 in FIG. 5A, the CAD representation of the object may be obtained, and may be oriented such that the build direction for the object (i.e., the direction in which layers are to be added) is oriented vertically (i.e., in the Z direction).

Figure 6:
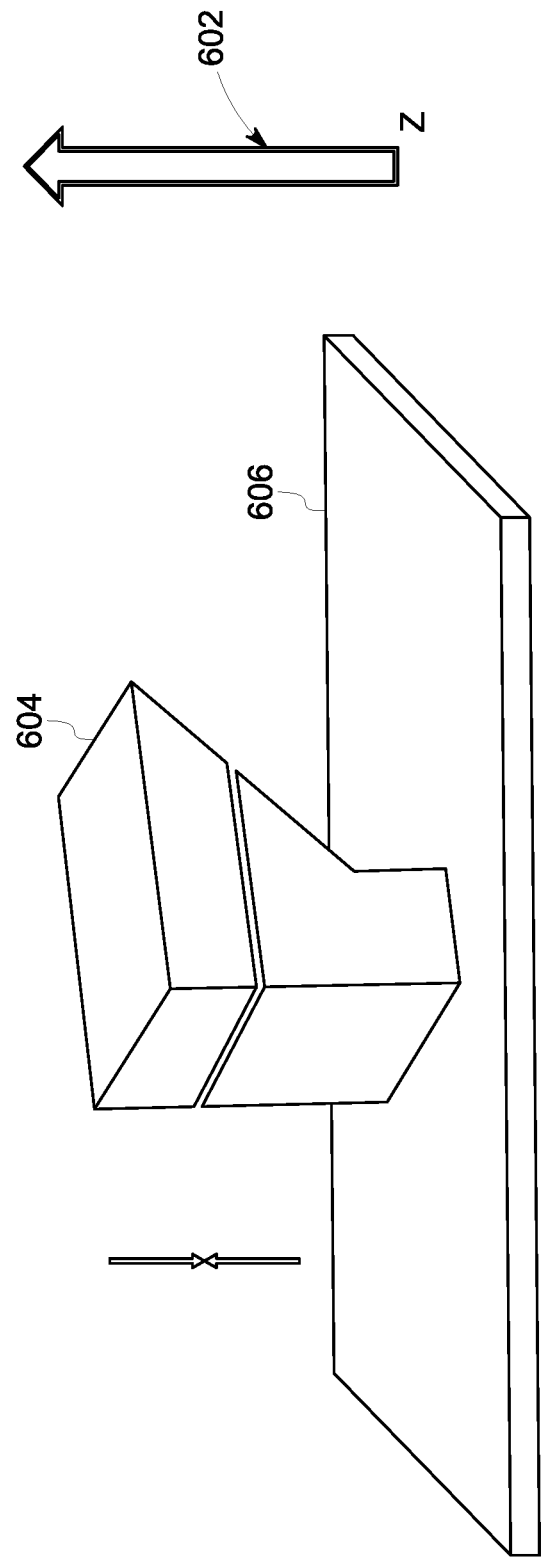
FIG. 6 is a schematic isometric view of aspects of an object-build chamber provided in the apparatus of FIG. 1.

FIG. 6 is a schematic isometric view of aspects of an object-build chamber provided in the apparatus of FIG. 1 (specifically as a key aspect of the additive manufacturing tool 102). FIG. 6 is useful in describing aspects of the process of FIG. 5. For example, arrow 602 illustrates the Z direction (the build direction) referred to in the previous paragraph. Also shown in FIG. 6 is a schematic representation of the object 604 that is to be built. The object 604 rests on build plate 606 which (as is well known) is the portion of the build chamber from which the object is built up layer by layer.

At block 504 in FIG. 5A, the Z location for modeling purposes is set at the location of the top surface of the build plate 606. The Z height will progress upwards during the workflow of the process of FIGS. 5A and 5B.

At block 506, characteristics/conditions of the build plate 606 are entered into the model. These characteristics may be known from specifications of the additive manufacturing tool 102, or may be determined by measurement. These characteristics may include the temperature of the build plate 606 during object build operations and a heat-loss-characteristic of the build plate 606.

Block 508 indicates that succeeding blocks are to be performed successively (until a breakpoint—discussed below—in the illustrated process) with respect to each layer or adjacent group of layers for which the modeling is performed.

At block 510, the Z location is incremented upwardly.

Figure 7:
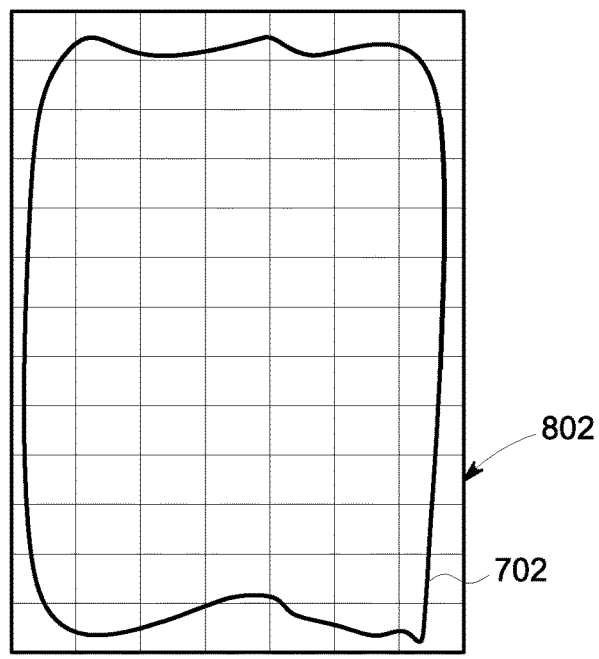
FIG. 7 is a diagram showing a layer-wise configuration of a simulated object to be built according to some embodiments.

At block 512, a horizontal outline profile for the object at the current Z location is derived from the CAD representation of the object. This may be done by sectioning through the CAD representation at the current Z location. FIG. 7 shows a simulated example profile 702 for the object at the current Z location.

Figure 8:
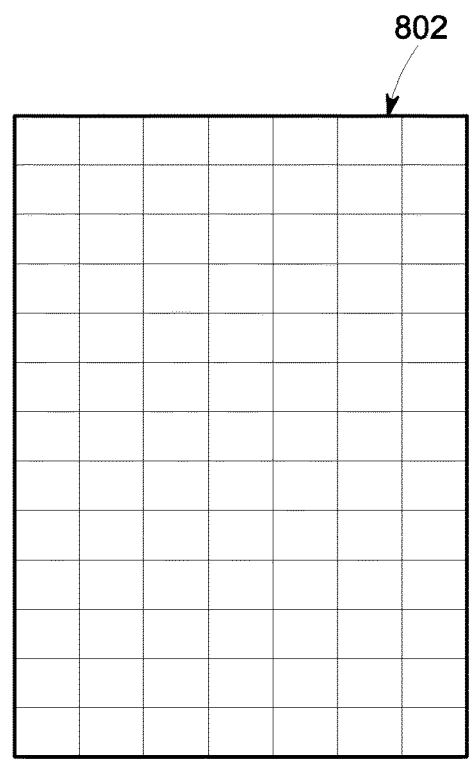
FIG. 8 is a diagram that shows volumetric cells to be used for modeling and other purposes in the process of FIGS. 5A and 5B.

At block 514, a uniform grid of cells is generated extending in both horizontal directions to include the profile 702. FIG. 8 illustrates the grid 802 apart from the profile. FIG. 7 shows the grid 802 of FIG. 8 superimposed on the profile. All the cells defined by the grid have the same dimensions. In one embodiment, each cell is 1 mm square in the horizontal plane. However, other sizes of cells may be used and/or the cells need not be square.

Block 516 indicates that the ensuing sequence of process steps (up to an end of the sequence as noted in the following discussion) is to be performed successively for each cell in the current layer/Z location.

At block 518, for the current cell, a set of constraining characteristics may be developed to address production and/or finished-object-attribute objectives for the object to be built. The constraining characteristics may include, for example, one or more of scan speed, laser power, spot size, direction of scan, thermal characteristics, strain orientation, and density. Other constraining characteristics may be developed in addition to or instead of those listed in the prior sentence.

FIG. 9 is a diagram that shows cells of the grid 802 populated with indicators of cell-wise-determined objectives in a simulation of the process of FIGS. 5A and 5B and in accordance with the performance of block 518. Referring to FIG. 9, the letter "S" in a cell indicates that strain orientation is a constraint defined for that cell. The letter "G" in a cell indicates that grain orientation is a constraint defined for that cell. The letter "T" in a cell indicates that a thermal characteristic is a constraint defined for that cell. The letter "V" in a cell indicates that scan velocity is a constraint defined for that cell. Some cells may have more than one constraint defined therefor. For example, the cell indicated at 902 has strain orientation, grain orientation and scan velocity as constraints defined for that cell. In other embodiments, other or additional types of constraints may be applied to at least some cells.

At block 520 in FIG. 5A, an estimate is generated for the current cell as to the heat-loss-characteristic of the corresponding portion of the object to be built. This estimate may be developed by an estimator function based on results of routine experimentation with the material (as solidified) from which the object is to be built. The heat-loss-characteristic may depend on the heat-loss-characteristics of surrounding cells in the object-during-build and the amount of applied energy. The estimate may take the form of a constant number or may be a function of time (i.e., a description of change in heat-loss-characteristic over time).

FIG. 10 is a diagram that shows cells of the grid 802 populated with simulated cell-wise heat-loss-characteristic estimated values or functions. The cell indicated at 1002, for example, is populated with a function rather than a constant value.

As an alternative for block 520, an estimated thermal time constant may be calculated for the current cell.

At block 522 in FIG. 5A, an estimate is generated for the temperature in the current cell, taking into consideration the time since the corresponding cell in the previous layer was processed and also taking into consideration the temperature of adjacent cells. The estimate may take the form of a single temperature value, a set of temperature values, or a function of time (i.e., a description of change in temperature over time).

Figures 11, 12:
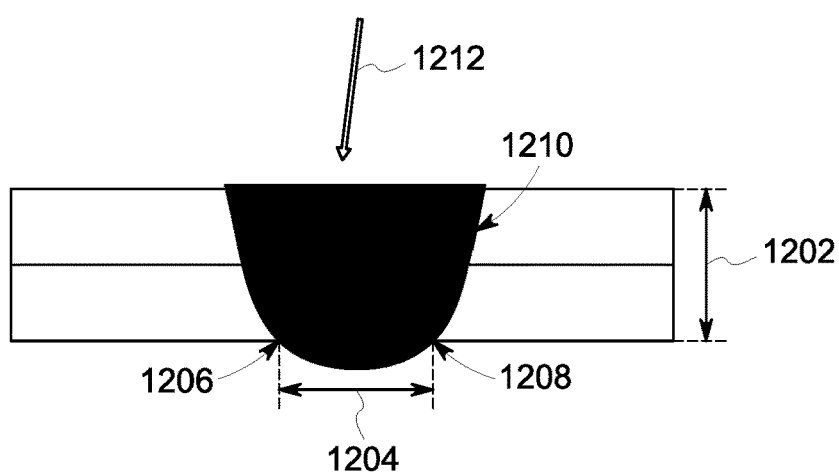
FIG. 11 is a diagram that shows cells of FIG. 8 populated with simulated cell-wise estimated temperature levels.
FIG. 12 is a schematic vertical sectional illustration of a melt pool that may be formed during the process of FIGS. 5A and 5B.

FIG. 11 is a diagram that shows cells of the grid 802 populated with simulated cell-wise estimated temperature levels. The cell indicated at 1102, for example, is populated with a function rather than a single value.

As an alternative for block 522, the size of an associated melt pool may be estimated.

At block 524, for the current cell, parameters are determined for driving the laser(s) for processing the cell, with the parameters including, for example, power, speed and focus. The estimated temperature and heat-loss-characteristic are used for the calculation, and the goal of the calculation is to result in a melt pool that satisfies the constraints applied to that cell at block 518. A limitation also applicable to the calculation is that the resulting melt pool not extend beyond the profile 702 in the current layer or any adjacent layer.

In one embodiment, the parameters to produce the melt pool may be constrained such that the heat flowing through the top surface of the cell is sufficient to melt through a predetermined depth of material to result in a desired melt pool width at that depth. FIG. 12 is a diagram that illustrates such a constraint condition. Two-headed arrow 1202 represents the predetermined depth. Two-headed arrow 1204 represents the desired melt pool width at that depth. Points 1206 and 1208 represent points of intersection between the melt pool 1210 and the depth 1202. Thus the width 1204 is defined by the distance between the points 1206 and 1208. The heavier downward pointing arrow 1212 represents the application of heat (laser) to the top surface of the corresponding cell.

In an alternative constraint, each cell/voxel is to be maintained at or above a minimum temperature (sufficient to maintain the material in a molten state) for a minimum period of time or maintain a pre-designated cooling profile over time. Such a constraint may produce a desirable grain structure in the finished object.

In determining parameters at block 524, factors to be considered may include material cooling rate, thermal gradient, and/or cooling time for a given temperature.

In some embodiments, the required laser driving parameters may be looked up from the model/table described above in connection with block 501. Alternatively, a computation may be performed to determine those parameters. The computation may be performed by an estimating function derived from the types of data needed to generate the model/table of block 501.

Once blocks 518-524 have been performed for every cell in the current layer, then in some embodiments (such as those that are constrained to achieve a minimum melt pool width-at-depth, as described above) may determine a layer thickness for the current layer (as indicated by block 526). According to these embodiments, the layer thickness is set to the shallowest depth of melt pool (across the cells of the current layer) that achieves the required melt pool width and dwell-time of molten condition. Thus in these embodiments, the layer thickness may vary from layer to layer based on temperature analysis and modeling. This may allow layer thickness to be no thicker than necessary to achieve the build objectives, thereby potentially saving on expenditure of power. In alternative embodiments, the layer thickness may be varied within a given layer. For example, the core of the object may have a different layer thickness, in a given layer, from the portions of the layer close to the surface of the object. In such embodiments, the layer thickness may not be restricted to the shallowest melt pool in the layer, but rather the thickness may be grouped in islands of separate layer thicknesses. The number of such islands may be traded off against possible reduction in throughput due to added recoating time.

Referring now to block 528, which may also be performed for each cell in the current layer (as an alternative to the layer-thickness setting of block 526), a desired laser scan spacing parameter may be determined for the current cell. The scan spacing may be set to the smallest desired melt pool width within the cell. This may allow wider spacing between scans, allowing for more rapid processing of the current layer. In an example, with a goal of wider, shallower melt pools to promote throughput, the scan spacing could be increased for a given cell from, say, 100 microns to 110 microns.

FIG. 13 is a diagram that shows cells of the grid 802 populated with simulated scan spacing determined for each cell during the process of FIGS. 5A and 5B.

Figure 14:
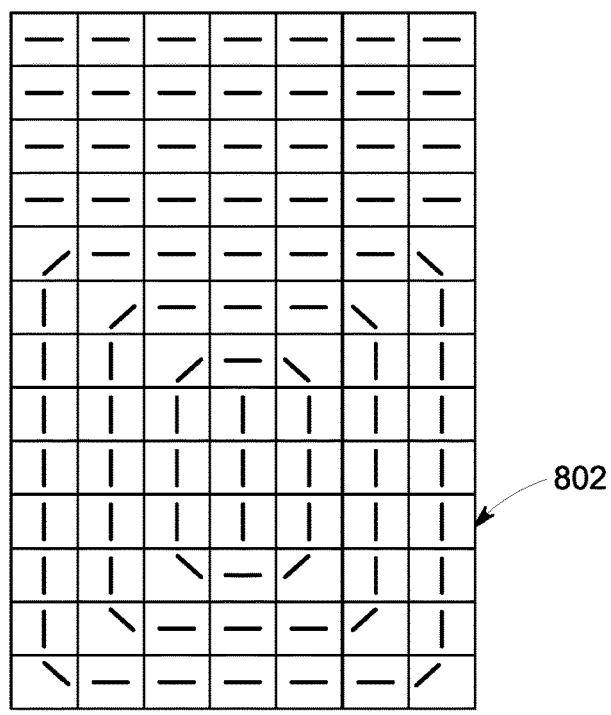
FIG. 14 is a diagram that shows cells of FIG. 8 populated with simulated strain directions determined for each cell during the process of FIG. 5B.
Figure 15:
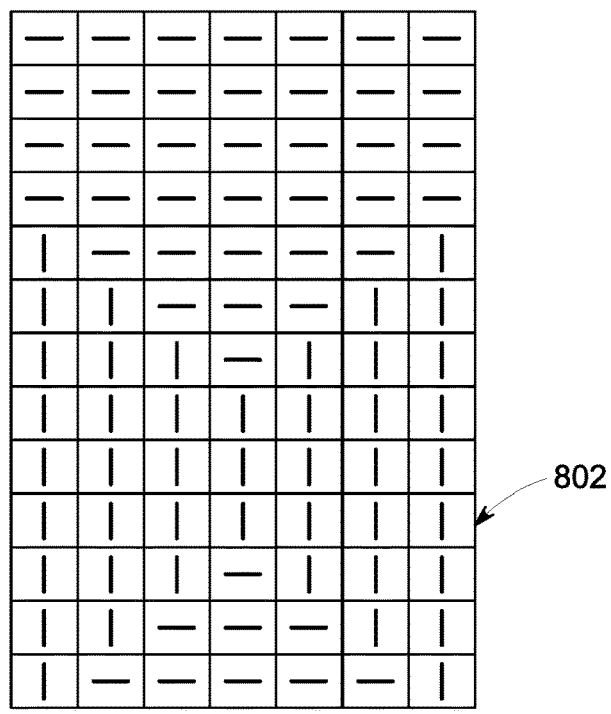
FIG. 15 is similar to FIG. 14, but showing a simulated alternative set of cell-wise strain directions.

Referring now to FIG. 5B, at block 519, for each cell, the expected strains for that cell are estimated using the expected overall part distortion or local feature distortion as learned from experience or from a finite element model or another engineering prediction. FIG. 14 is a diagram that shows cells of the grid populated with simulated strain directions determined for each cell according to block 519. FIG. 15 is similar to FIG. 14, but showing a simulated alternative set of cell-wise strain directions.

Continuing to refer to FIG. 5B, at block 521, the desired strain contribution for each cell is calculated. The desired strain may be generated to cancel or augment the expected strain.

At block 523 in FIG. 5B, the scan path direction is set to result in the desired net strain contribution from each cell when the strain imparted by the scan paths is combined with the expected strain.

The processing of blocks 519, 521, 523 is at least logically parallel with the processing at blocks 520, 522, 524, 528 (FIG. 5A). At block 532 (FIG. 5A), the desired scan path parameter set (power, speed, focus, spacing) and the scan directions (as determined from the desired strains) are assigned to the current cell/voxel and a set of scan paths are generated that travel in the correct direction with the correct parameters, as seen in FIG. 17. Moreover, adjustments may be made in joining the scan paths to speed up printing as seen in FIG. 16.

Scan directions may be arranged for continuous flow across cell boundaries or may end at cell boundaries, or end within the cells. There is a further constraint in that the resulting melt pool not extend beyond the profile 702 in the current layer or any adjacent layer.

At 532, a set of scan paths are assembled as a data set or sub-file to guide the operation of the additive manufacturing tool 102 in processing the current layer being analyzed. The scan-path operation is to be used to control the additive manufacturing tool 102 in a later phase of the process when the object is being built. The scan path data set or sub-file indicates where scanning of the laser (not separately shown) or lasers of the additive manufacturing tool 102 is to occur at the time of processing the currently-being-analyzed layer. In generating the scan path data set or sub-file, the cell-wise scan powers, scan speeds, spacings, laser spot size, and directions are used and incorporated in the scan-path data set or sub-file. Where continuous scan paths are not possible, abrupt changes may be used as needed.

Figure 16:
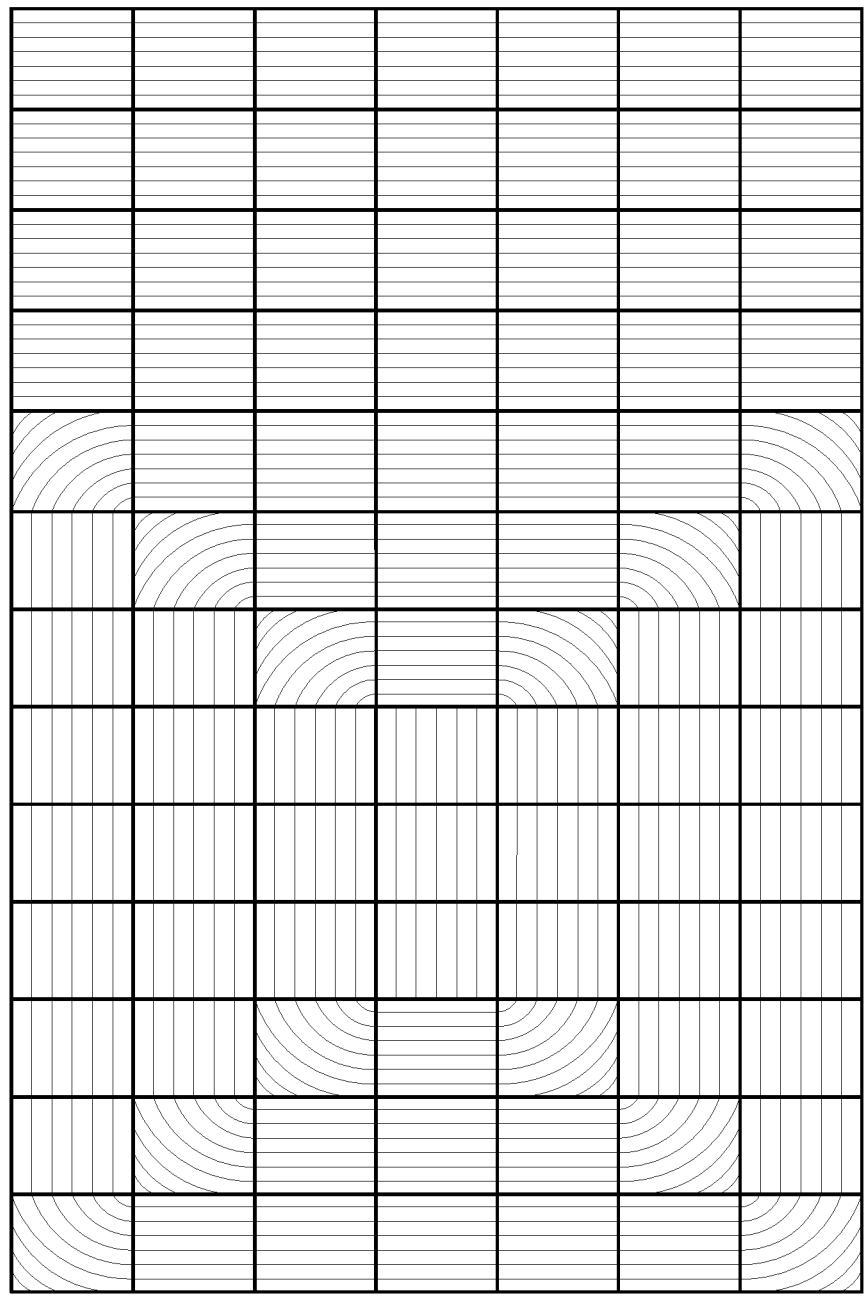
FIG. 16 is a diagram that shows a simulated set of scan paths determined for a layer of cells during the process of FIGS. 5A and 5B.
Figure 17:
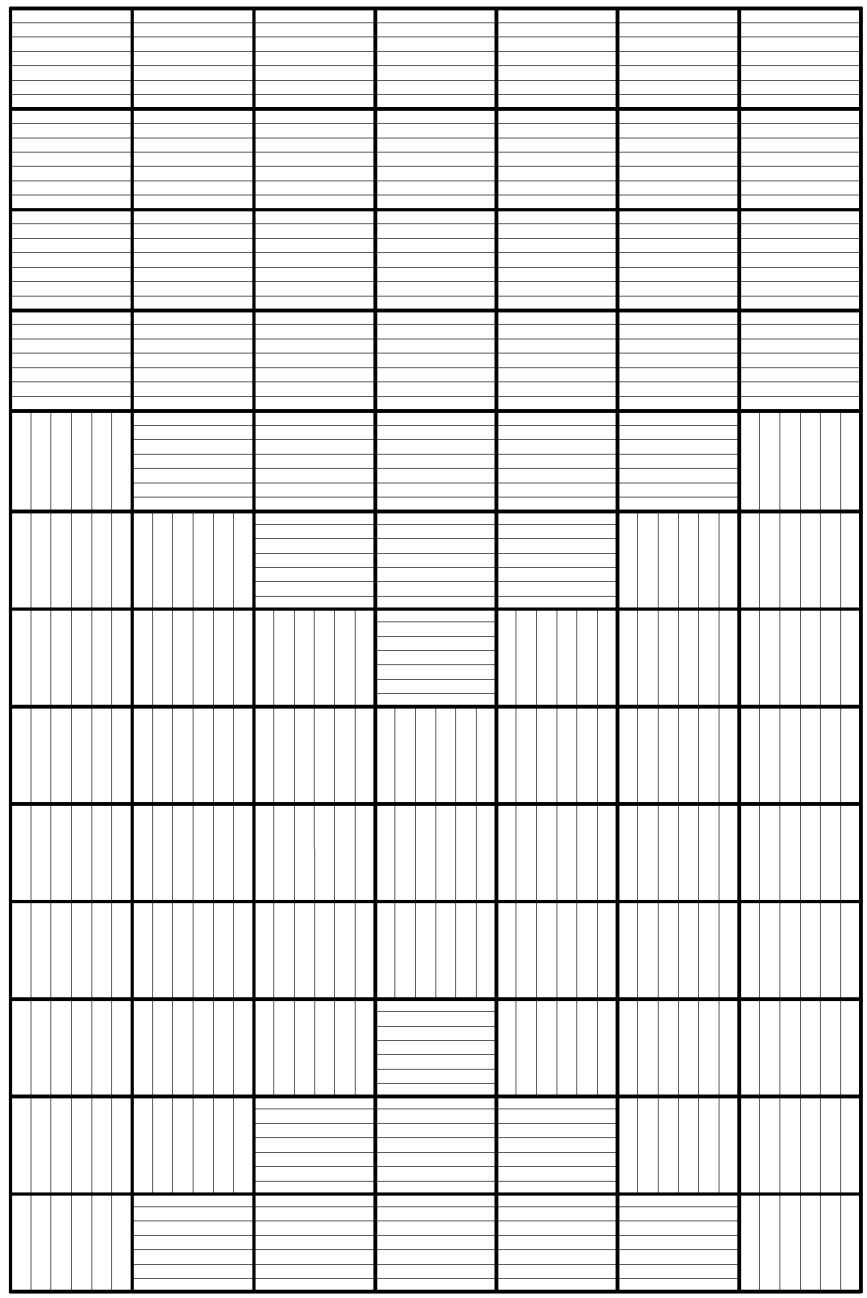
FIG. 17 is similar to FIG. 16, but showing a simulated alternative set of scan paths.

FIG. 16 is a diagram that shows a simulated set of scan paths determined for a layer of cells during the process of FIG. 5. FIG. 17 is similar to FIG. 16, but showing a simulated alternative set of scan paths.

Noting a point made above with respect to block 508, the process illustrated in blocks 510 through 532 may be repeated for each layer of the object to be built, moving successively upward in the Z direction. The resulting layer scan path data sets or sub-files collectively are stored by the control component 104 as accumulated scan data or a scan path file for controlling the additive manufacturing tool 102 to build the object.

At each layer the accumulated heat may be used to adjust the underlying thermal voxellized thermal model to reflect the amount of heat designed to fall in each of the voxels. In the same way the expected strain may be used to adjust the underlying strain model. Adjustments in both underlying models can be used to improve the results for subsequent layers.

At this point, the process of FIGS. 5A and 5B may advance to block 534. At block 534, the scan path data generated at blocks 508 through 532 is employed by the control component 104 to control the additive manufacturing tool 102 to build the object.

With a process as described in connection with FIGS. 5A and 5B, it may be the case that, for each cell in each layer, the laser scanning to build that cell may be optimized for one or more characteristics. The characteristics may be scan speed, melt pool size, material time at temperature, direction of solidification, or direction of material strain while cooling. The characteristics may also or alternatively include porosity, minimizing or preventing cracking, obtaining a desired surface finish, and/or geometry deformation or prevention thereof. The process of FIGS. 5A and 5B allows for a unified approach for managing constraints and applying parameters to meet the constraints. The process of FIGS. 5A and 5B further considers, in an automated fashion, geometric features of the object to be built and integrates those features with an understanding of heat loss/transfer, strain and other models built into the system/process.

In some embodiments, the control component 104 and the additive manufacturing tool 102 may be co-located and step 534 may be performed immediately or with minimal delay (i.e., virtually in real time) after completion of step 532. In other embodiments, or other situations, the control component 104 and the additive manufacturing tool 102 may be co-located, but step 534 may be performed after a considerable lapse of time following completion of step 532. In still other embodiments, the control component 104 and the additive manufacturing tool 102 may be remote from each other. In such embodiments, real-time operation may occur, or alternatively, the control component 104 may store the scan path data upon completion of step 532; the scan path data may be subsequently forwarded to, or otherwise made available to, the additive manufacturing tool 102 to permit step 534 to be performed.

In embodiments described herein, DMLM was presented as an example of a type of additive manufacturing. However, the analysis and tool-guidance techniques described herein are also applicable, without limitation, to types of additive manufacturing other than DMLM. As used herein and in the appended claims, the term "additive manufacturing tool" refers to a device that performs any type of additive manufacturing as defined herein. As used herein and in the appended claims, "additive manufacturing" refers to systems and methods that include, for example, and without limitation, vat photopolymerization, powder bed fusion, binder jetting, material jetting, sheet lamination, material extrusion, directed energy deposition and hybrid systems. These systems and methods may include, for example, and without limitation, stereolithography; digital light processing; scan, spin, and selectively photocure; continuous liquid interface production; selective laser sintering; direct metal laser sintering; selective laser melting; electron beam melting; selective heat deposition lamination; ultrasonic additive manufacturing; fused filament fabrication; fused deposition modeling; laser metal deposition; laser engineered net shaping; direct metal deposition; hybrid systems; and combinations of these methods and systems. These methods and systems may employ, for example, and without limitation, all forms of electromagnetic radiation, heating, sintering, melting, curing, binding, consolidating, pressing, embedding, and combinations thereof.

These methods and systems employ materials including, for example, and without limitation, polymers, plastics, metals, ceramics, sand, glass, waxes, fibers, biological matter, composites, and hybrids of these materials. These materials may be used in these methods and systems in a variety of forms as appropriate for a given material and method or system, including for example without limitation, liquids, solids, powders, sheets, foils, tapes, filaments, pellets, liquids, slurries, wires, atomized, pastes, and combinations of these forms.

As used in this disclosure and in the appended claims, the term "tool guidance data" includes, without limitation, scan path data as described above, and refers to any data used to drive an additive manufacturing tool to build an object layer-by-layer or in another manner.

Figure 18:
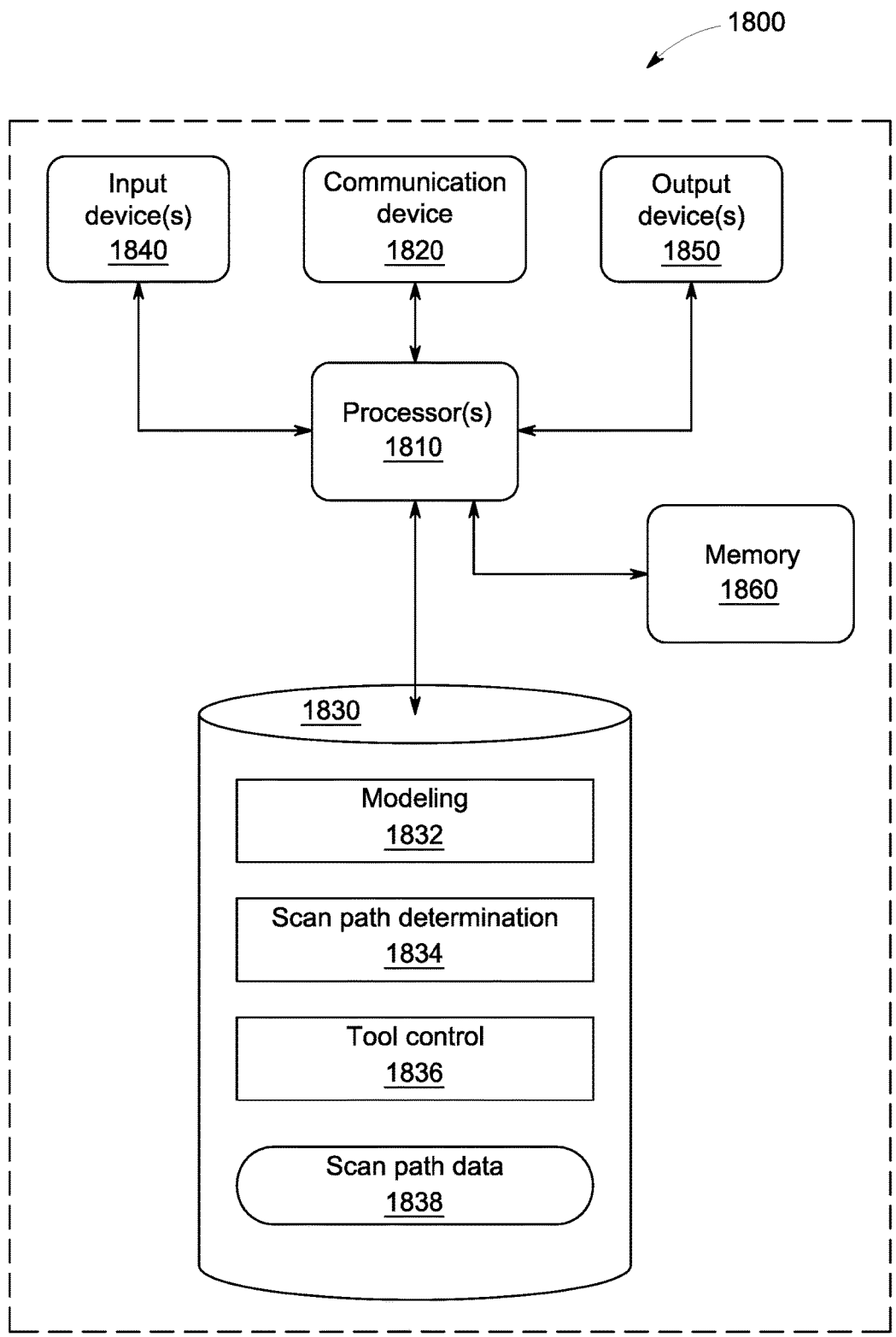
FIG. 18 is a block diagram of a control component according to some embodiments.

System 1800 shown in FIG. 18 is an example hardware-oriented representation of the control component 104 shown in FIG. 1. Continuing to refer to FIG. 18, system 1800 includes one or more processors 1810 operatively coupled to communication device 1820, data storage device 1830, one or more input devices 1840, one or more output devices 1850 and memory 1860. Communication device 1820 may facilitate communication with external devices, such as a reporting client, or a data storage device. Input device(s) 1840 may include, for example, a keyboard, a keypad, a mouse or other pointing device, a microphone, knob or a switch, an infra-red (IR) port, a docking station, and/or a touch screen. Input device(s) 1840 may be used, for example, to enter information into the system 1800. Output device(s) 1850 may include, for example, a display (e.g., a display screen) a speaker, and/or a printer and/or may output control signals to control operation of the additive manufacturing tool 102 (FIG. 1).

Continuing to refer to FIG. 18, data storage device 1830 may include any appropriate persistent storage device, including combinations of magnetic storage devices (e.g., magnetic tape, hard disk drives and flash memory), optical storage devices, Read Only Memory (ROM) devices, etc., while memory 1860 may include Random Access Memory (RAM).

Data storage device 1830 may store software programs that include program code executed by processor(s) 1810 to cause system 1800 to perform any one or more of the processes described herein. Embodiments are not limited to execution of these processes by a single apparatus. For example, the data storage device 1830 may store a modeling software program 1832 that provides modeling functionality as described above in connection with FIG. 5.

Data storage device 1830 may also store a scan path determination software program 1834, which may provide functionality to generate scan path data as described above in connection with FIGS. 5A and 5B. In addition, data storage device 1830 may store a software module 1836 to enable the system 1800 to issue commands/control signals to control the additive manufacturing tool 102. Moreover, data storage device 1830 may store scan path data 1138, such as may be generated via the process of FIGS. 5A and 5B. Data storage device 1830 may store other data and other program code for providing additional functionality and/or which are necessary for operation of system 1800, such as device drivers, operating system files, etc., and one or more kinds of data apart from scan path data.

A technical effect is to provide improved techniques for control of additive manufacturing devices.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may include any number of hardware and/or software elements suitable to provide the functions described herein as well as any other functions. For example, any computing device used in an implementation of some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. A person of ordinary skill in the relevant art may recognize other embodiments may be practiced with modifications and alterations to that described above.

What is claimed is:

1. A method comprising:
    obtaining a CAD (computer-aided design) representation of an object;
    applying thermal and/or strain modeling to the CAD representation;
    generating scan path data based at least in part on a result of the thermal and/or strain modeling; and
    generating a build file comprising the scan path data, wherein the build file comprises instructions that configure an additive manufacturing tool to generate the object according to the scan path data;
    wherein the scan path data includes a plurality of layer scan path data sets, each of the layer scan path data sets for controlling the additive manufacturing tool to form a respective layer of the object;
    the method further comprising:
    determining respective thicknesses of at least some of said layers of the object based at least in part on a result of said thermal and/or strain modeling, said thicknesses not being identical for all of said layers.

2. The method of claim 1, wherein said thicknesses of said at least some of the layers are determined by a melt pool analysis of the result of the thermal and/or strain modeling for said at least some of the layers.

3. The method of claim 2, wherein said melt pool analysis predicts melt pool behavior of a material to be used to form the object.

4. The method of claim 3, wherein the material is a powdered metal alloy.

5. The method of claim 2, wherein the additive manufacturing tool is controlled to vary respective thicknesses of layers of the object based at least in part on the result of the thermal and/or strain modeling.

6. The method of claim 1, wherein the scan path data is optimized for at least one of (a) speed of manufacturing; (b) melt pool size; (c) material time at temperature; (d) direction of solidification; (e) direction of material strain while cooling; (f) porosity; (g) minimizing or preventing cracking; (h) obtaining a desired surface finish; and (i) geometry deformation or prevention thereof.

7. The method of claim 1, wherein the scan path data prescribes scan spacing based at least in part on a melt pool analysis based on the result of the thermal and/or strain modeling.

8. The method of claim 1, wherein the scan path data includes varying power level setting data for changing output power of a laser component of the additive manufacturing tool as the scan path data is executed by the additive manufacturing tool.

9. The method of claim 8, wherein the scan path data includes varying power level setting data for changing respective output power levels of each of a plurality of laser components of the additive manufacturing tool as the scan path data is executed by the additive manufacturing tool.

10. An apparatus comprising:
a processor; and
a memory in communication with the processor, the memory storing program instructions, the processor operative with the program instructions to perform functions as follows:
    obtaining a CAD (computer-aided design) representation of an object;
    applying thermal and/or strain modeling to the CAD representation;
    generating scan path data based at least in part on a result of the thermal and/or strain modeling; and
    generating a build file comprising the scan path data, wherein the build file comprises instructions that configure an additive manufacturing tool to generate the object according to the scan path data;
wherein:
    the scan path data includes a plurality of layer scan path data sets, each of the layer scan path data sets for controlling the object-forming component to form a respective layer of the object; and
    the processor is further programmed to determine respective thicknesses of at least some of said layers of the object based at least in part on a result of said thermal and/or strain modeling, said thicknesses not being identical for all of said layers.

11. The apparatus of claim 10, wherein said thicknesses of said at least some of the layers are determined by a melt pool analysis of the result of the thermal and/or strain modeling for said at least some of the layers.

12. The apparatus of claim 11, wherein said melt pool analysis predicts melt pool behavior of a material to be used to form the object.

13. The apparatus of claim 12, wherein the material is a powdered metal alloy.

14. A method comprising:
    obtaining a CAD (computer-aided design) representation of an object;
    applying thermal and/or strain modeling to the CAD representation;
    generating tool guidance data based at least in part on a result of the thermal and/or strain modeling; and
    generating a build file comprising the tool guidance data, wherein the tool guidance data comprises instructions that configure an additive manufacturing tool to generate the object according to the tool guidance data;
    wherein the tool guidance data includes a plurality of layer tool guidance data sets, each of the layer tool guidance data sets for controlling the additive manufacturing tool to form a respective layer of the object;
the method further comprising:
    determining respective thicknesses of at least some of said layers of the object based at least in part on a result of said thermal and/or strain modeling, said thicknesses not being identical for all of said layers.

* * * * *